(12) United States Patent
Blumer et al.

(10) Patent No.: US 9,359,055 B2
(45) Date of Patent: Jun. 7, 2016

(54) COMPOSITE PADDLES

(71) Applicant: Confluence Outdoor, LLC, New Canaan, CT (US)

(72) Inventors: Hastings M. Blumer, Greenville, SC (US); David J. Rossman, Greenville, SC (US); Martin T. Connolly, San Marcos, CA (US); Ernest J. Jacques, Jr., Taylors, SC (US)

(73) Assignee: Confluence Outdoor, LLC, Greenville, SC (US)

( * ) Notice: Subject to any disclaimer, the term of this patent is extended or adjusted under 35 U.S.C. 154(b) by 0 days.

(21) Appl. No.: 14/452,174

(22) Filed: Aug. 5, 2014

(65) Prior Publication Data

US 2016/0039507 A1    Feb. 11, 2016

(51) Int. Cl.
*B63H 16/04* (2006.01)
*B32B 37/14* (2006.01)

(52) U.S. Cl.
CPC .............. *B63H 16/04* (2013.01); *B32B 37/144* (2013.01); *B32B 2260/023* (2013.01); *B32B 2262/10* (2013.01)

(58) Field of Classification Search
CPC ........................................................ B63H 16/04
USPC ................................................. 440/101–102
See application file for complete search history.

(56) References Cited

U.S. PATENT DOCUMENTS

| | | | |
|---|---|---|---|
| 3,733,300 A | 5/1973 | Fujita et al. | |
| 4,610,633 A * | 9/1986 | Freudenberg | B63H 16/04 416/74 |
| 4,820,216 A * | 4/1989 | Masters | B63H 16/04 416/70 R |
| 4,955,839 A * | 9/1990 | Kaschper | B29C 44/12 416/74 |
| 5,061,418 A * | 10/1991 | Ware | B29C 43/32 264/257 |
| 5,227,227 A | 7/1993 | Boulanger | |
| 5,820,424 A * | 10/1998 | Steinhour | B63H 16/04 440/101 |
| 5,842,830 A * | 12/1998 | Franznick | B63H 16/04 416/229 R |
| 6,126,500 A * | 10/2000 | Bell | B63H 16/04 440/101 |
| 6,568,971 B1 * | 5/2003 | Abbenhouse | B29C 44/569 416/70 R |
| 6,755,706 B1 * | 6/2004 | Lin | B63H 16/04 440/101 |
| 6,796,862 B1 * | 9/2004 | Abbenhouse | B63H 16/04 416/74 |
| 7,708,610 B1 * | 5/2010 | Horan | B63H 16/06 440/101 |
| 8,003,037 B2 * | 8/2011 | Sherwood | B29C 37/0028 264/257 |
| 8,088,320 B1 | 1/2012 | Bedard | |
| 8,109,734 B2 | 2/2012 | Backhouse | |
| 8,168,292 B2 | 5/2012 | Morin | |
| 8,974,141 B2 * | 3/2015 | Williford | B63H 16/04 403/396 |

(Continued)

*Primary Examiner* — Lars A Olson
*Assistant Examiner* — Jovon Hayes
(74) *Attorney, Agent, or Firm* — Womble Carlyle Sandridge & Rice, LLP

(57) ABSTRACT

Disclosed are composite paddles that may be used in kayaking and other sports alike. A composite paddle may include a shaft connected to one or more blades. A paddle blade may include a spine having a distal end and a proximal end to be connected to a mandrel; and a body having a layered cross-sectional profile to enclose the spine. The layered cross-sectional profile may include at least three adjacent layers of unidirectional carbon fiber or unidirectional fiberglass. Other embodiments may be described and/or claimed.

21 Claims, 9 Drawing Sheets

(56) References Cited

U.S. PATENT DOCUMENTS

| | | |
|---|---|---|
| 2002/0025423 A1 | 2/2002 | Dreher et al. |
| 2004/0235377 A1 | 11/2004 | Byma et al. |
| 2006/0182949 A1* | 8/2006 | Salnikov .................. C08J 7/047 428/327 |
| 2009/0149283 A1* | 6/2009 | Garcia .................. A63B 59/70 473/563 |
| 2009/0149284 A1* | 6/2009 | Garcia .................. A63B 59/70 473/563 |
| 2013/0022799 A1 | 1/2013 | Yeh |
| 2013/0115839 A1 | 5/2013 | Arvidson et al. |
| 2013/0122763 A1 | 5/2013 | Fish et al. |
| 2014/0273674 A1* | 9/2014 | Doyle .................. B63H 16/04 440/101 |
| 2014/0335355 A1 | 11/2014 | Ettin et al. |
| 2014/0335752 A1 | 11/2014 | Ettin et al. |

* cited by examiner

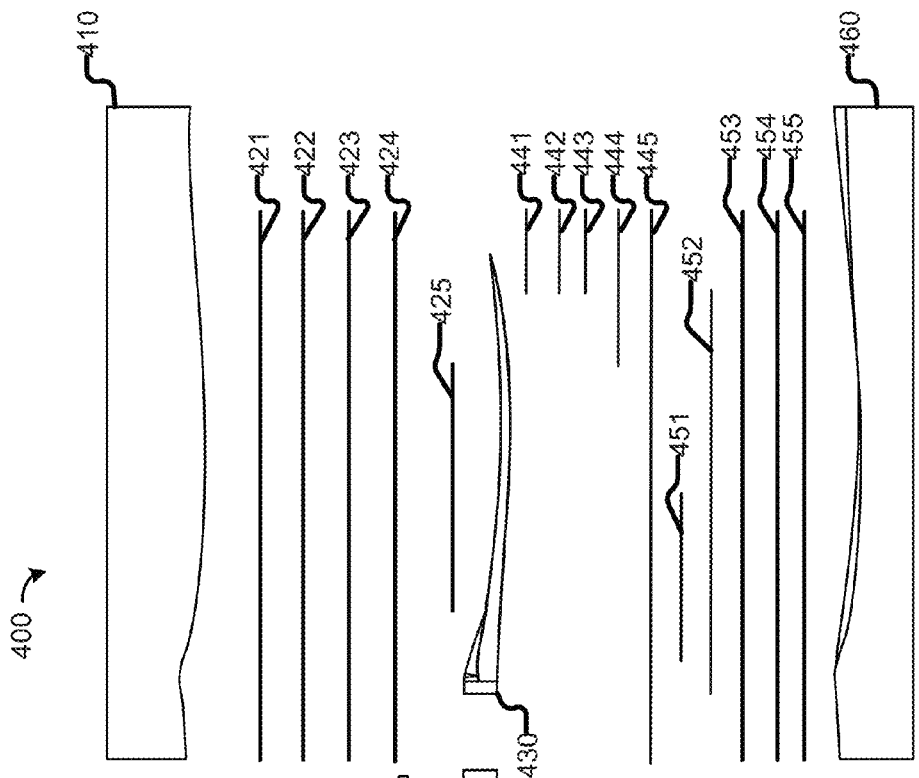
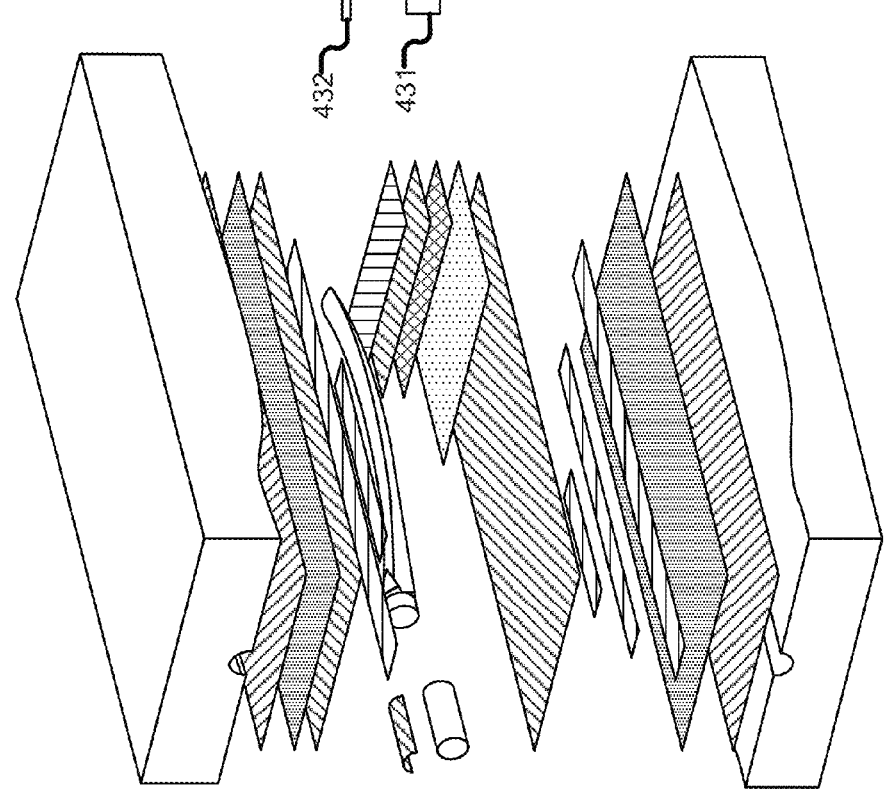
FIG. 4B
FIG. 4A

COMPOSITE PADDLES

TECHNICAL FIELD

The present disclosure relates to composite paddles for use with kayaks, canoes, stand-up boards, and the like.

BACKGROUND

Paddles are used to propel small watercraft such as kayaks, canoes, and stand-up boards. Kayak paddles generally consist of a relatively straight shaft with blades on the ends, whereas paddles for canoes and stand-up boards typically include a relatively straight shaft with a paddle on one end. The following description will deal primarily with kayak paddles having blades on each end, but it should be understood that the invention is broad enough to be used with any other type of boating paddle.

Paddles were originally constructed of wood poles with straight shafts and rudimentary blades nailed or glued to the shaft. With the development of modern synthetic materials, modern paddles are lighter, are stronger, and have improved geometric shapes to withstand the high degree of force and stress experienced by the paddler in all sorts of conditions.

Whitewater paddling is the most abusive form of paddling, as the equipment and paddle must navigate through dangerous rapids, falls, boulders, etc. Due to the severe conditions and friction, a blade may be torn or worn off, typically at the tip or edges of the blade, thus resulting in a shortened lifespan. Due to the extreme forces, the paddles may break, typically at the points of interconnection between the paddling blades and the shaft. A paddle that catastrophically breaks during use may not only render the paddle completely unusable, but also cause a life-threatening situation, such as losing control, capsizing, or colliding into rocks or other hazards.

DRAWINGS

Embodiments will be readily understood by the following detailed description in conjunction with the accompanying drawings. Embodiments are illustrated by way of example and not by way of limitation in the figures of the accompanying drawings.

FIG. 4A is a perspective layup view and FIG. 4B is a corresponding side layup view of yet another paddle blade, incorporating aspects of the present disclosure, in accordance with various embodiments;

DETAILED DESCRIPTION

Figure 1A:
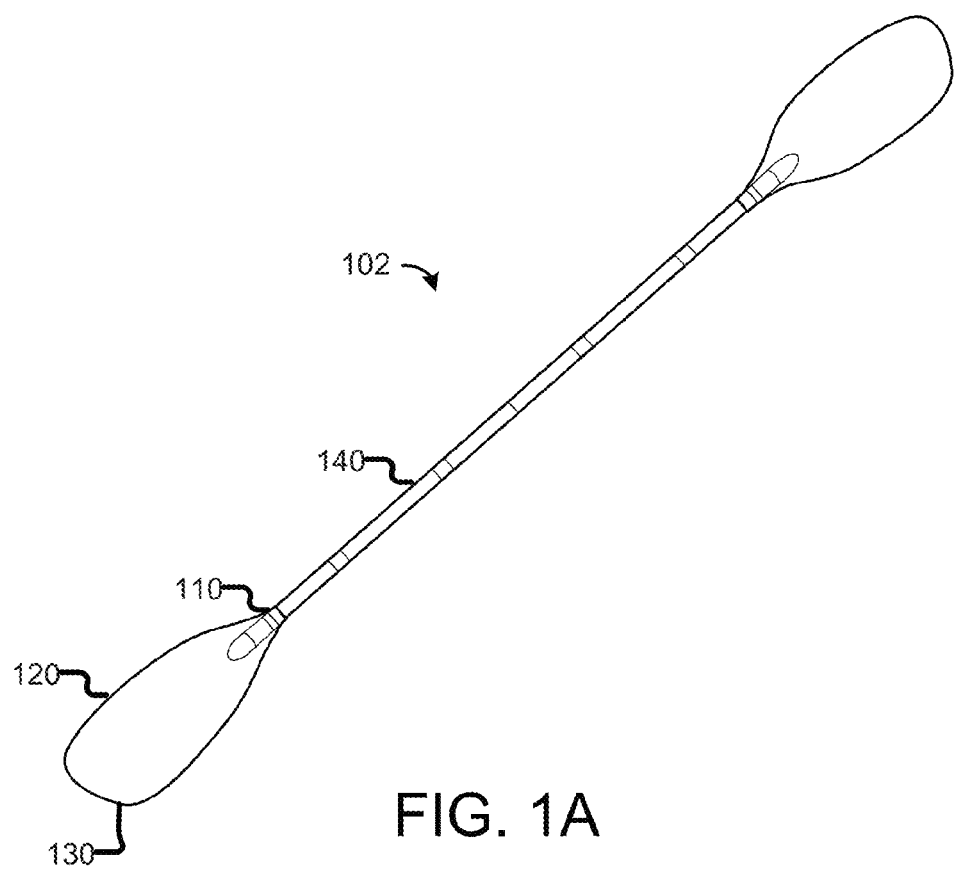
FIG. 1A and FIG. 1B are front views of two examples of composite paddles, incorporating aspects of the present disclosure, in accordance with various embodiments.

Embodiments of composite paddles are described herein. In some embodiments, a composite paddle may include a shaft connected to one or more blades. A paddle blade may include a body having opposing outer surfaces and a layered cross-sectional profile, which may include a commingled layer of thermoplastic filaments commingled with fiber filaments. A paddle shaft may include a layup structure with a layer of unidirectional thermoplastic fibers and/or a commingled layer of thermoplastic filaments commingled with fiber filaments. These and other aspects of the present disclosure will be more fully described below.

In the following detailed description, reference is made to the accompanying drawings that form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B, and C). For the purposes of the description, a phrase in the form "(A)B" means (B) or (AB); that is, A is an optional element.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in embodiments," "in some embodiments," "in various embodiments," or the like, which may each refer to one or more of the same or different embodiments. Furthermore, the terms "comprising," "including," "having," and the like, as used with respect to embodiments of the present disclosure, are synonymous.

Figure 1B:
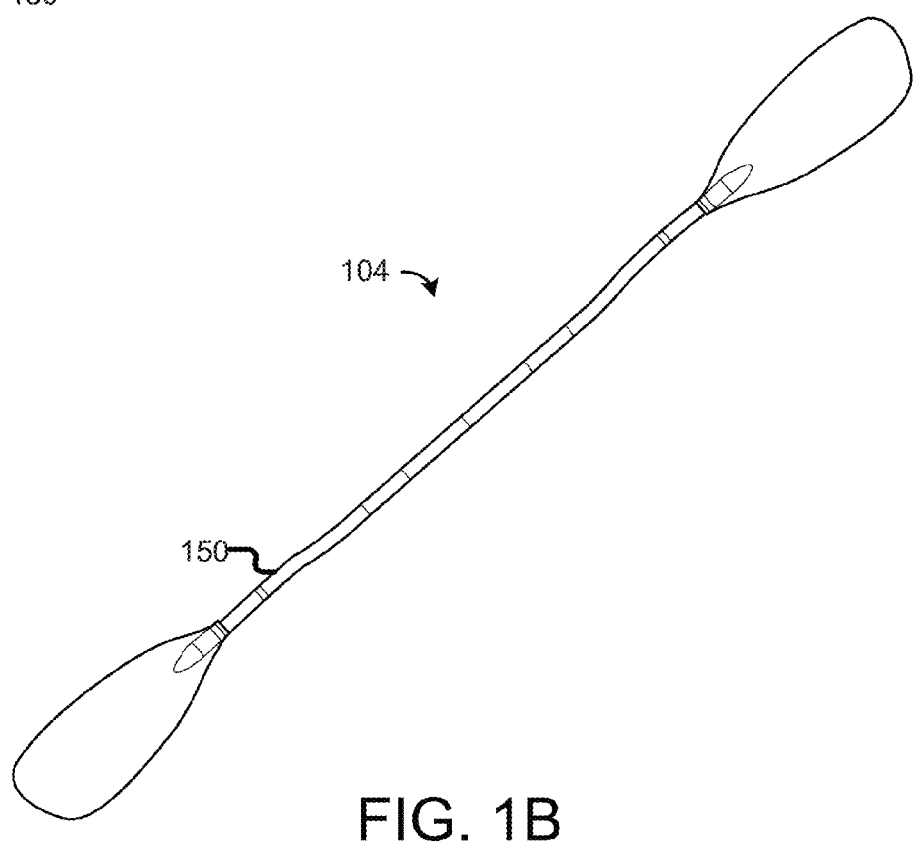

FIG. 1A and FIG. 1B each are a front view of examples of composite paddles, incorporating aspects of the present disclosure, in accordance with various embodiments. As shown in FIG. 1A, in various embodiments, paddle 102 may include straight shaft 140, which is adaptively connected to blade 120 at its proximal end 110. Blade 120 may have a substantially flat shape with proximal end 110 and distal end 130, wherein proximal end 110 is closer to shaft 140 than distal end 130.

As shown in FIG. 1B, in some embodiments, paddle 104 may include ergonomic shaft 150. Ergonomic shaft 150 may include one or more curved gripping regions, which may improve the overall strength of the paddle while substantially reducing hand and arm fatigue for a paddler.

Figure 2B:
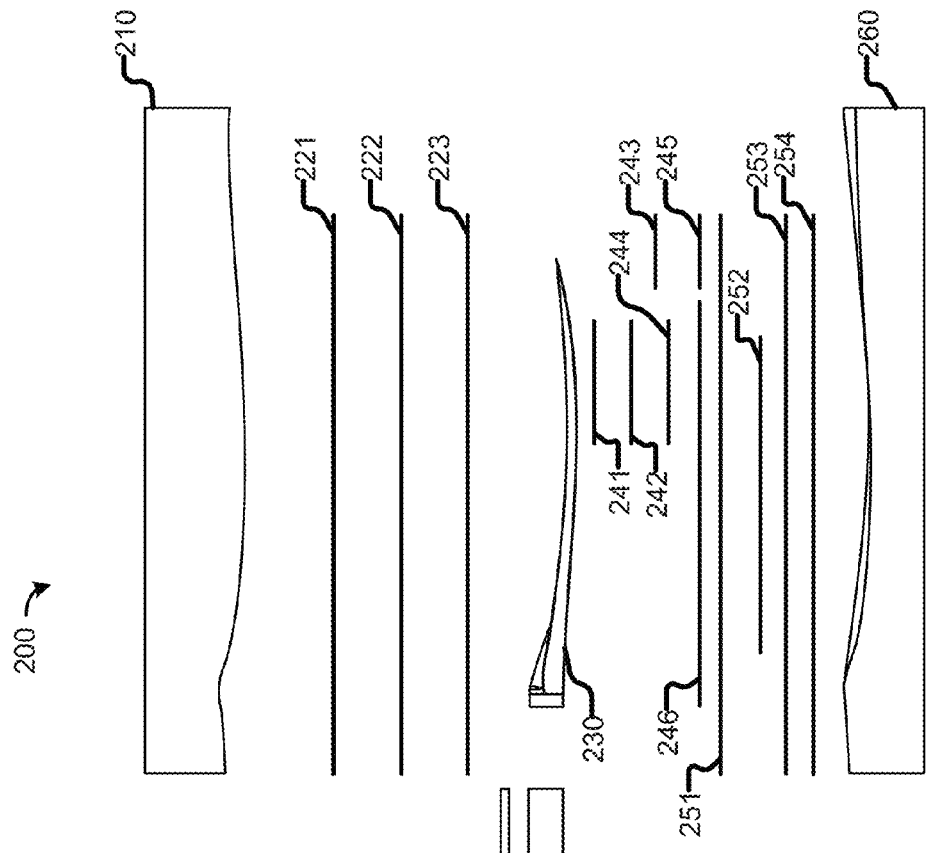
FIG. 2A is a perspective layup view and FIG. 2B is a corresponding side layup view of a paddle blade, incorporating aspects of the present disclosure, in accordance with various embodiments.
Figure 2A:
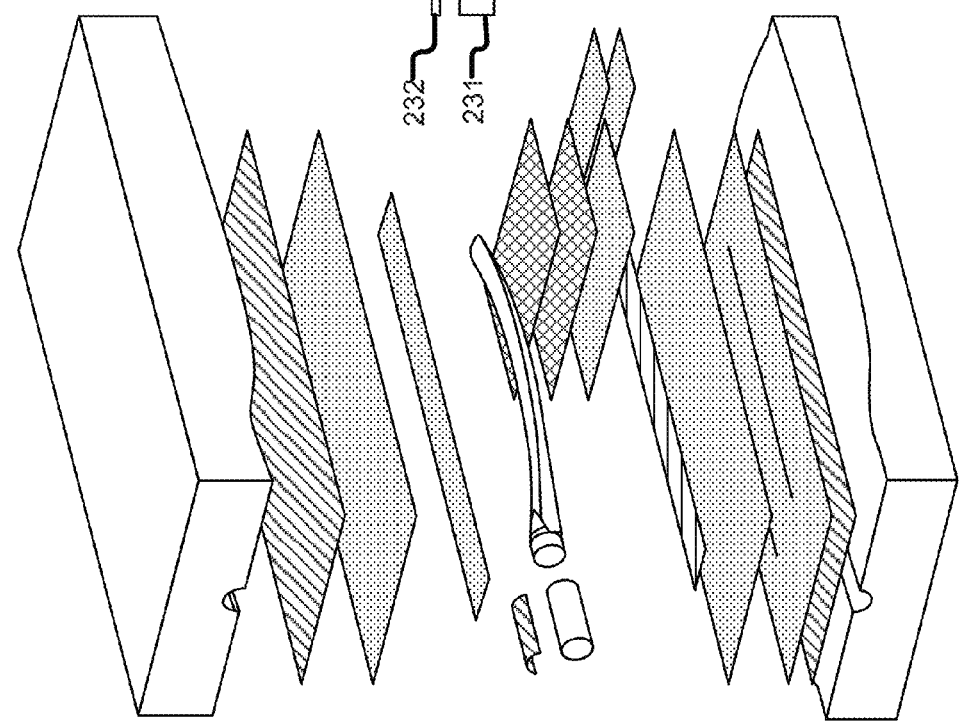

FIG. 2A is a perspective layup view and FIG. 2B is a corresponding side layup view of a paddle blade, incorporating aspects of the present disclosure, in accordance with various embodiments. For example, as shown in FIG. 2B, in various embodiments, the process for making a kayak paddle may utilize a mold, e.g., a clamshell-like mold. As shown, the mold may include upper mold half 210 and lower mold half 260. The facing surfaces of upper mold half 210 and lower mold half 260 may define the contours of a paddle blade to be formed by the mold. In some embodiments, the power face of a paddle blade may face the upper mold half 210 while the non-power face of the paddle blade may face lower mold half 260.

A fabric, used in the layup process, may have a particular fiber orientation that specifies how a fabric is oriented in a mold. Unidirectional fibers run in only one direction while other fibers may run in one or more directions together. In some embodiments, the 0-degree axis may run the length of the spine of a paddle blade. Therefore, when the fiber orientation is at 0 degrees, the fibers run the length of the blade. In some embodiments, woven fabrics may be placed with a fiber orientation either in 0/90 degrees or ±45 degrees. When placed at 0/90 degrees, fibers run parallel to the spine and perpendicular to the spine. When placed at ±45 degrees, fibers run neither parallel nor perpendicular to the spine; instead, they run across the blade at a 45-degree angle in each direction. In some embodiments, triaxial fabric may run in three directions. For example, when placed at ±45/0 degrees, fibers run across the blade at a 45-degree angle in each direction as well as parallel to the spine. In some embodiments, continuous filament mat may have no fiber orientation because the fibers in this fabric run in seemingly random directions.

In some embodiments, fabrics in the layup process may be placed at various fiber orientations to ensure strength and stiffness of a paddle blade or shaft. If all fibers ran in the same direction, the part would be very strong in one direction, but very weak in another direction. For example, when fibers run at 0 degrees, they provide compressive strength, tensile strength, and/or stiffness, but very little torsional strength.

As illustrated in FIG. 2B, in some embodiments, layup 200 may include surface veil 221 with a fiber orientation at 0/90 degrees on one outer surface of a blade, such as serving as the surface finish on the power face of the blade. In some embodiments, surface veil 221 may use lightweight fiberglass weave to improve the surface quality of finished parts.

Next, layup 200 may include a commingled layer 222 made of thermoplastic filaments and fiber filaments commingled at the filament level as illustrated in connection to FIG. 3. Commingled layer 222 may serve as a full structural layer for the blade and forms the first substantial layer on this side of the blade. In one embodiment, the fiber orientation of the commingled layer 222 may be at ±45 degrees. In other embodiments, commingled layer 222 may have a different fiber orientation from 0 to 180 degrees. Within this woven fabric of commingled layer 222, each yarn is comprised of both polypropylene filaments and fiberglass filaments that are commingled together; multiple yarns are then woven together to form the fabric. This commingled material may provide a number of benefits that fiberglass alone does not. For example, the commingled material may be significantly lighter, more abrasion resistant, more impact resistant, and more buoyant.

Next to the commingled layer 222, layup 200 may include triaxial strip 223, e.g., with a fiber orientation at ±45/0 degrees, to reinforce the spine stiffness. In some embodiments, the dimension of triaxial strip 223 may be substantially similar to spine 230, and triaxial strip 223 may be placed directly above spine 230. In some embodiments, strength and stiffness may be the primary concern for triaxial strip 223. Therefore, fiberglass may be used for triaxial strip 223.

In some embodiments, spine 230 may have a foam core. In some embodiments, spine 230 may be connected to mandrel 231. Mandrel 231 may be wrapped around by triaxial strip 232. In some embodiments, mandrel 231 may be a cylindrical aluminum mandrel and may be used to create the blade's hosel in which the shaft is inserted and bonded. During the layup process, the hosel may be placed in the mold at the same time as the spine. In some embodiments, triaxial strip 232 may be made from fiberglass weave with a fiber orientation at 0/90 degrees.

Toward lower mold half 260, layup 200 may include two layers of triaxial strips 241 and 242. In some embodiments, triaxial strips 241 and 242 may have a substantially shorter length compared to the length of the blade, and be placed in the middle as the middle step. In some embodiments, triaxial strip 241 may have a fiber orientation at ±45 degrees, and triaxial strip 242 may have a fiber orientation at 0/90 degrees. In some embodiments, triaxial strips 241 and 242 may be mid-sized layers of fiberglass weave.

Next, layup 200 may include mat 243. In some embodiments, mat 243 may be a small section of continuous filament fiberglass mat, which may be placed in the tip of the mold to form a part of the tip of the blade to improve strength and durability in this highly exposed area of the blade.

Figure 6:
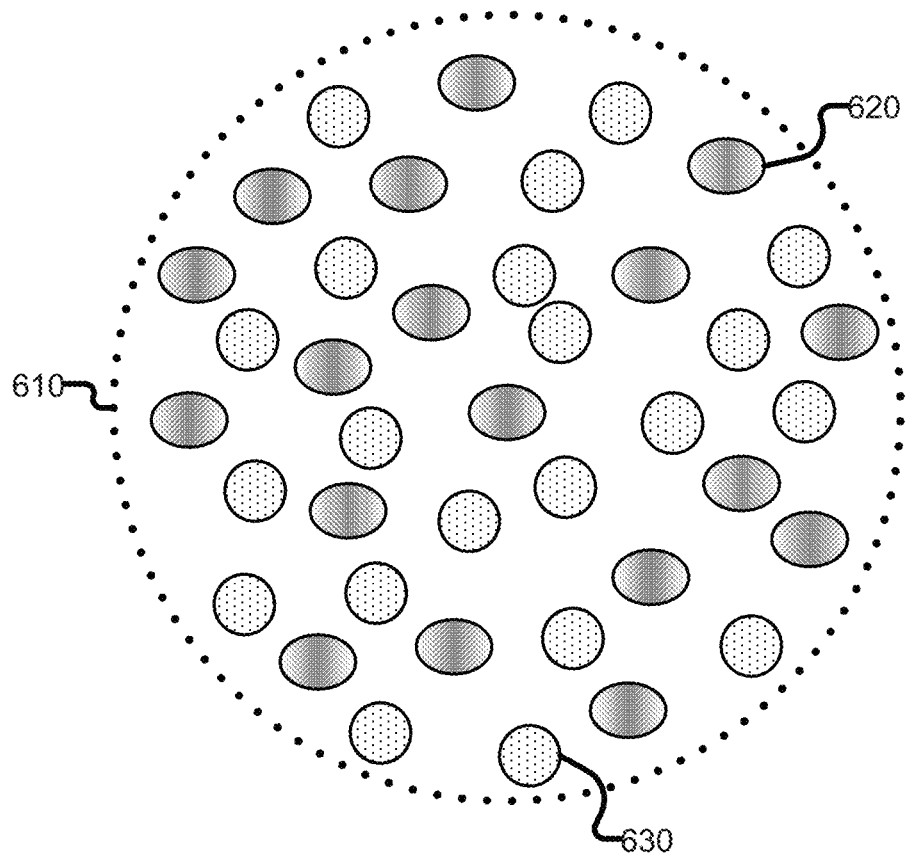
FIG. 6 is a schematic partial cross-section view of a commingled yarn, incorporating aspects of the present disclosure, in accordance with various embodiments.

Next, layup 200 may include another commingled layer 244, similarly made of thermoplastic filaments and fiber filaments commingled at the filament level as illustrated in FIG. 6. The commingled material may substantially improve impact and abrasion resistance in this area while contributing less weight when compared to fiberglass. In some embodiments, commingled layer 244 may have a fiber orientation at 0/90 degrees. In some embodiments, commingled layer 244 may be a mid-sized layer, like triaxial strips 241 and 242. In some embodiments, triaxial strip 241, triaxial strip 242, and commingled layer 244 may form the first section of the multi-tiered reinforced tip to increase durability in the sections of the blade that are most exposed to repeated impact and abrasion. This section of the blade may be thicker than the primary structure, but may not be as thick as the tip of the blade.

Next, layup 200 may include mat 245, which may be a small section of triaxial fiberglass placed in the tip of the mold to form the tip of the blade to improve strength and durability in this highly exposed area of the blade.

Next, layup 200 may include triaxial strip 246, e.g., with a fiber orientation at ±45/0 degrees, to reinforce the spine stiffness similar to triaxial strip 246. In some embodiments, the dimension of triaxial strip 246 may be substantially similar to the spine. In some embodiments, triaxial strip 246 may be shorter than the length of spine 230. In some embodiments, strength and stiffness may be the primary concern for triaxial strip 246. Therefore, fiberglass may be used for triaxial strip 246, as fiberglass is stiffer than polypropylene.

Next, layup 200 may include another commingled layer 251, similarly made of thermoplastic filaments and fiber filaments commingled at the filament level as illustrated in FIG. 3. In some embodiments, commingled layer 251 may have a fiber orientation at 0/90 degrees. In some embodiments, commingled layer 251 may serve as a full structural layer on this side of the blade.

Next, layup 200 may include one or more mat strips 252 to fill up spine corners.

Next, layup 200 may include another commingled layer 253, similarly made of thermoplastic filaments and fiber filaments commingled at the filament level as illustrated in FIG. 6. In some embodiments, commingled layer 253 may have a fiber orientation at ±45 degrees. In some embodiments, commingled layer 253 may serve as a full structural layer on the other side of the spine for the blade.

Therefore, commingled layers 251 and 253 may form the primary structure of this side of the blade. This commingled material provides a number of benefits that fiberglass alone does not. When compared to 100% fiberglass, it is significantly lighter, more abrasion resistant, more impact resistant, and more buoyant.

Next, layup 200 may include veil 254 with a fiber orientation at 0/90 degrees. In some embodiments, veil 254 may be a full-sized layer of fiberglass surface veil, and this lightweight fiberglass weave may be used to improve the surface quality of the non-power face of the blade.

Figures 3A, 3B:
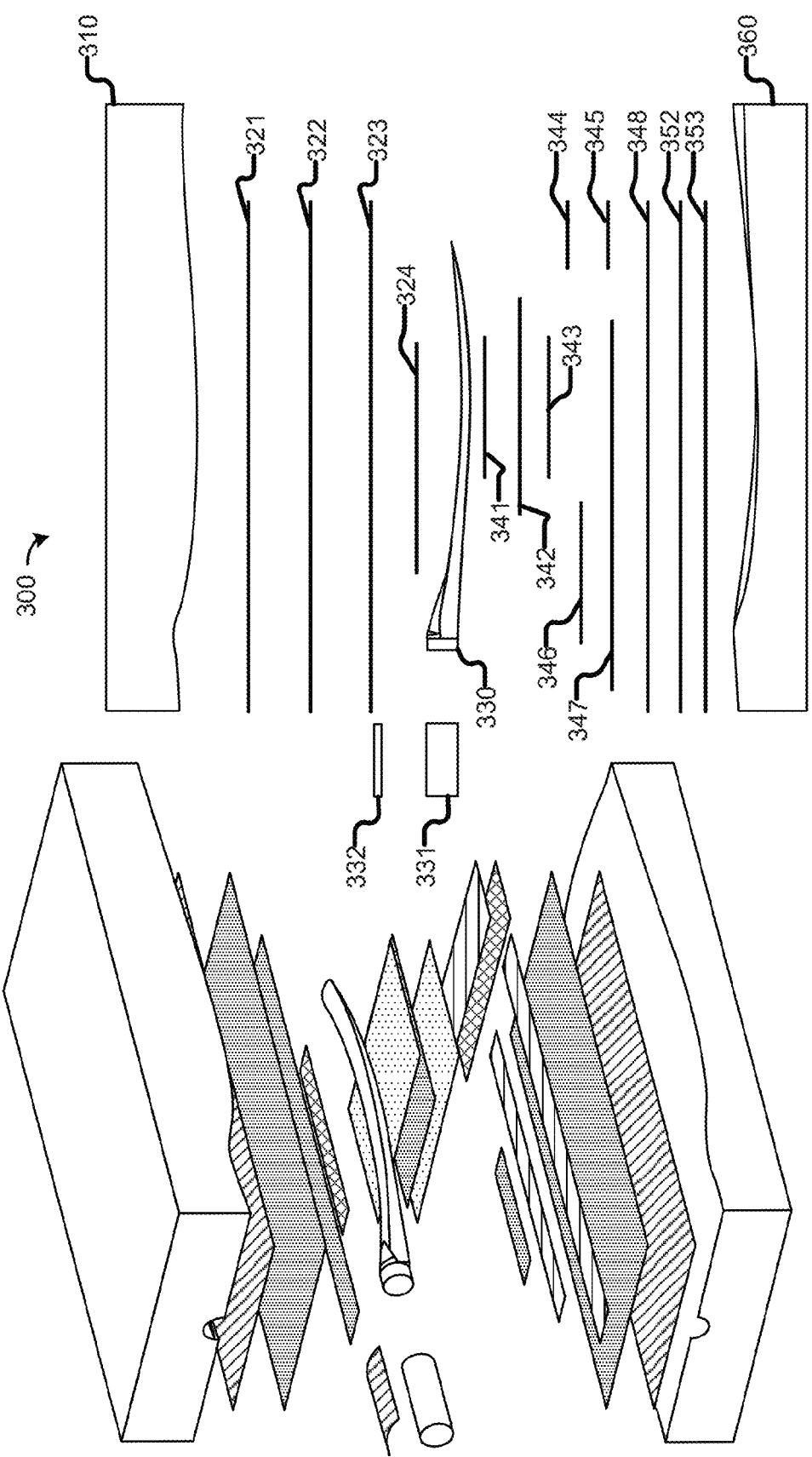
FIG. 3A is a perspective layup view and FIG. 3B is a corresponding side layup view of another paddle blade, incorporating aspects of the present disclosure, in accordance with various embodiments.

FIG. 3A is a perspective layup view and FIG. 3B is a corresponding side layup view of another paddle blade, incorporating aspects of the present disclosure, in accordance with various embodiments. Analogous to FIG. 2B, as shown in FIG. 3B, a clamshell-like mold may be used for making a kayak paddle. As shown, the mold may include upper mold half 310 and lower mold half 360, and their respective facing surfaces may define the contours of a paddle blade to be formed by the mold. In some embodiments, the power face of a paddle blade may face the upper mold half 310 while the non-power face of the paddle blade may face lower mold half 360.

As illustrated in FIG. 3B, in some embodiments, layup 300 may include surface veil 321 with a fiber orientation at 0/90 degrees on one outer surface of a blade, such as serving as the surface finish on the power face of the blade. In some embodiments, surface veil 321 may use glass fabric to improve the surface quality of finished parts.

Next to surface veil 321, layup 300 may have triaxial layer 322, e.g., with a fiber orientation at ±45/0 degrees, to serve as a full structural layer. In some embodiments, the dimension of triaxial layer 322 may be substantially similar to surface veil 321 to fully cover the blade. In some embodiments, strength and stiffness may be a concern for triaxial layer 322. Therefore, fiberglass may be used for triaxial layer 322. In some embodiments, unbalanced triaxial fiberglass (e.g., more fibers running at 0 degrees than running at ±45 degrees) may be used to provide additional strength and stiffness based on the fact that extra fibers are running at 0 degrees.

Toward spine 330, layup 300 may include two layers of fiberglass strips 323 and 324. In some embodiments, fiberglass strip 323 may have a comparable length as the blade, while fiberglass strip 324 may have a substantially shorter length compared to fiberglass strip 323. In some embodiments, fiberglass strip 324 may also be narrower than fiberglass strip 323. In some embodiments, fiberglass strips 323 and 324 may be unidirectional fiberglass to make the blade stiffer and stronger.

In some embodiments, spine 330 may have a foam core to maintain spine structure. In various embodiments, spine 330 may be connected to mandrel 331. Mandrel 331 may be wrapped around by strip 332. In some embodiments, mandrel 331 may be a cylindrical aluminum mandrel and may be used to create the blade's hosel in which a shaft may be inserted and bonded. During the layup process, the hosel may be placed in the mold at the same time as the spine. In some embodiments, strip 332 may be made from fiberglass weave with a fiber orientation at 0/90 degrees.

Toward lower mold half 360, commingled layer 342 may be sandwiched by two glass weave layers 341 and 343. Commingled layer 342 may include a commingled fabric made of thermoplastic filaments and fiber filaments commingled at the filament level as illustrated in connection to FIG. 6. Within the commingled fabric, each yarn is comprised of both polypropylene filaments and fiberglass filaments that are commingled together; multiple yarns are then woven together to form the commingled fabric. Commingled layer 342 may provide a number of benefits that a fiberglass layer alone does not. For example, commingled layer 342 may be significantly lighter, more abrasion resistant, more impact resistant, and more buoyant. In one embodiment, the fiber orientation of commingled layer 342 may be at 0/90 degrees. In other embodiments, commingled layer 342 may have a different fiber orientation from 0 to 180 degrees. In some embodiments, glass weave layers 341 and 343 may have a similar fiber orientation as commingled layer 342, e.g., at 0/90 degrees. All these layers may have substantially similar dimensions, and may be added to layup 300 for enhanced impact and abrasion resistance without adding too much weight.

Next, layup 300 may include mat 344 and commingled layer 345. In some embodiments, mat 344 may be a small section of continuous strand mat, which may be highly conformable and easily controlled for thickness. Commingled layer 345 may be similarly made of thermoplastic filaments and fiber filaments commingled at the filament level as commingled layer 342. The commingled material may substantially improve impact and abrasion resistance in this area while contributing less weight when compared to fiberglass. In some embodiments, commingled layer 345 may have a fiber orientation at 0/90 degrees. Both layers may be placed in the tip of the mold to form a part of the multi-tiered reinforced tip of the blade to improve strength and durability of this highly exposed area of the blade that is often under repeated impact and abrasion.

Next, layup 300 may include three unidirectional fiberglass strips 346, 347, and 348, albeit these strips may have different lengths. For example, strip 348 may run the full length of the blade while strip 347 may be shorter than strip 348, and strip 346 may be even shorter. These three strips may be used to reinforce spine stiffness. In this embodiment, by adding unidirectional fiberglass strips to both sides of spine 330, blade strength and stiffness may be dramatically improved, so that the blade may bear higher compression or tension.

Further toward lower mold half 360, layup 300 may include triaxial layer 352 and veil 353. In some embodiments, triaxial layer 352 may be similar to triaxial layer 322 as discussed above, while veil 353 may be similar to veil 321. In some embodiments, veil 353 may be a full-sized layer of fiberglass surface veil, and this lightweight fiberglass weave may be used to improve the surface quality of the non-power face of the blade.

In other embodiments, commingled layers made of thermoplastic filaments and fiber filaments commingled at the filament level may be placed directly beneath the two surface veil layers or with other configurations. In some embodiments, one or more commingled layers made of thermoplastic filaments and fiber filaments commingled at the filament level may be used in the wet layup process for building up a paddle.

FIG. 4A is a perspective layup view and FIG. 4B is a corresponding side layup view of yet another paddle blade, incorporating aspects of the present disclosure, in accordance with various embodiments. Analogous to FIG. 2B or FIG. 3B, a clamshell-like mold may be used for making a kayak paddle. As shown, the mold may include upper mold half 410 and lower mold half 460, and their respective facing surfaces may define the contours of a paddle blade to be formed by the mold. In some embodiments, the power face of a paddle blade may face the upper mold half 410 while the non-power face of the paddle blade may face lower mold half 460.

In this embodiment, layup 400 may include surface veil 421 with a fiber orientation at 0/90 degrees on one outer surface of a blade, such as serving as the surface finish for the power face of the blade. In some embodiments, surface veil 421 may use a lightweight fiberglass weave to improve the surface quality of the blade Surface veil 421 may be placed next to a layer of carbon weave 422, which may have a fiber orientation at 0/90 degrees and serve as full structural layers for the blade. Carbon weave 422 may form the first substantial layer on this side of the blade. Within this woven fabric, each yarn is comprised of carbon fiber filaments, and multiple yarns are then woven together to form the fabric. As compared to fiberglass, carbon weave 422 may be lighter, stiffer, and more impact resistant.

Immediately next to carbon weave 422, there may be commingled layer 423 made of thermoplastic filaments and fiber filaments, such as polypropylene and fiberglass, commingled at the filament level as schematically illustrated in FIG. 6. In one embodiment, the fiber orientation of the commingled layer 423 may be at 0/90 degrees. In other embodiments, commingled layer 423 may have a different fiber orientation from 0 to 180 degrees. Commingled layer 423 may form the next full layer on this side of the blade. Within this woven fabric, each yarn may comprise both polypropylene filaments and fiberglass filaments that are commingled together, and multiple yarns may then be woven together to form the fabric. When compared to fiberglass, this commingled material is significantly lighter, more abrasion resistant, more impact resistant, and more buoyant. When compared to carbon fiber, it is more buoyant, more abrasion resistant, and less expensive. By using this commingled material, additional weight savings and durability improvements may be gained, which would otherwise not be economically viable in constructing paddles.

Next to the commingled layer 423, layup 400 may include two fiberglass strips 424 and 425. It is some embodiments, fiberglass strip 424 may run the full length of the blade while fiberglass strip 425 may be shorter and narrower than fiberglass strip 424. Is some embodiments, unidirectional fiberglass may be used for these strips to reinforce the spine stiffness.

In some embodiments, spine 430 may have a foam core to maintain spine structure. In various embodiments, spine 430 may be connected to mandrel 431. Strip 432 may wrap around mandrel 431. In some embodiments, mandrel 431 may be a cylindrical aluminum mandrel and may be used to create the blade's hosel in which a shaft may be inserted and bonded. During the layup process, the hosel may be placed in the mold at the same time as the spine. In some embodiments, strip 432 may be made from fiberglass weave with a fiber orientation at 0/90 degrees.

Toward lower mold half 460, glass weave 441, commingled layer 442, and triaxial layer 443 may be added to each other to form a section of the multi-tiered reinforced tip to increase durability in the sections of the blade that are most exposed to repeated impact and abrasion. In various embodiments, glass weave 441 and commingled layer 442 may have a fiber orientation at 0/90 degrees, while triaxial layer 443 may have a fiber orientation at ±45 degrees. Commingled layer 442 may be made of thermoplastic filaments and fiber filaments commingled at the filament level as illustrated in FIG. 6. The commingled material may substantially improve impact and abrasion resistance in this area while contributing less weight when compared to fiberglass Next, layup 400 may include mat 444. In some embodiments, mat 444 may use fiberglass. In other embodiments, mat 444 may be a continuous strand mat, which may be highly conformable and easily controlled for uniform thickness. In some embodiments, mat 444 may serve as a middle step to improve strength and durability in this highly exposed area of the blade.

Further toward the non-power face of the blade, layup 400 may include another commingled layer 445, similarly made of thermoplastic filaments and fiber filaments commingled at the filament level as schematically illustrated in FIG. 6. In some embodiments, commingled layer 445 may have a fiber orientation at 0/90 degrees. In some embodiments, commingled layer 445 may serve as a full structural layer on this side of the blade.

Next, layup 400 may include three strips 451, 452, and 453 in different lengths. For example, strip 453 may run the full length of the blade while strip 452 may be shorter than strip 453, and strip 451 may be even shorter. In some embodiments, these three strips may be made from unidirectional carbon fiber. In other embodiments, these three strips may be made from unidirectional fiberglass. In various embodiments, these three strips may be used to reinforce spine stiffness. In this embodiment, by adding unidirectional fiberglass or carbon fiber to both sides of spine 430, blade strength and stiffness may be dramatically improved, so that the blade may bear higher compression or tension.

Further toward the non-power face of the blade, layup 400 may include a layer of carbon weave 454, which may have a fiber orientation at ±45 degrees and also serve as a full structural layer for the blade. This full-sized layer of carbon fiber weave may form the first substantial layer on this side of the blade. Within this woven fabric, each yarn is comprised of carbon fiber filaments, and multiple yarns are then woven together to form the fabric. Compared to fiberglass, this carbon fiber material is lighter, stiffer, and more impact resistant.

Next, the surface finish for the non-power face of the blade may be surface veil 455 with a fiber orientation at 0/90 degrees. In some embodiments, veil 455 may use lightweight fiberglass weave to improve the surface quality of the blade.

In other embodiments, commingled layers made of thermoplastic filaments and fiber filaments commingled at the filament level may be placed directly beneath the two surface veil layers or with other configurations. In some embodiments, one or more commingled layers made of thermoplastic filaments and fiber filaments commingled at the filament level may be used in the wet layup process for building up a paddle.

Figure 5A:
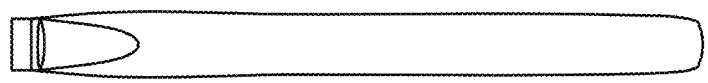
FIG. 5A is a front view of a spine of a paddle blade.
Figure 5B:
FIG. 5B is a side view of a spine of a paddle blade.

FIG. 5A is a front view of a spine of a paddle blade, and FIG. 5B is a side view of a spine of a paddle blade. In some embodiments, the spine may be made of a foam core. In some embodiments, the foam core used to create the blade's spine may be made by mixing a two-part foam and pouring it into a foam core mold to form the proper shape. The foam core may serve as a means to create a spine that is not solid fiberglass. A solid fiberglass spine would be very heavy and very stiff, so heavy that a paddle blade might nearly double in weight and so stiff that it might not be able to flex without breaking. Compared to a solid fiberglass spine, the foam core spine is lightweight and may still provide the scaffolding around which the composite materials can cure to form a blade.

In some embodiments, a spine may use a full foam core, which may substantially span the length and width of the blade. Full foam cores may reduce the overall weight of the paddle by replacing heavier layers of fiberglass or carbon fiber laminate with lighter foam. Therefore, full foam cores may improve the buoyancy of a paddle blade. However, the edges of a paddle blade with a full foam core may be prone to impact and abrasion damage on the blade edges, which can cause the composite laminate to delaminate and the blade's structure to be compromised. To improve the impact and abrasion resistance of full foam core blades, other materials may be added to the outermost edges of the blade layup to protect the structure from impact and abrasion damage. Even with an additional edging, this type of blade may still be prone to chipping and delamination when the additional material wears down to the composite laminate.

In some embodiments, as illustrated in FIG. 5A, a spine may use a foam core that is substantially narrower than the width of the blade. A composite paddle with a narrow core may be heavier and less buoyant than a paddle with a full foam core because the space now may be filled with heavier materials. However, such a narrow foam core may still stiffen a paddle blade, e.g., improving strength and stiffness of the paddle blade. Furthermore, a composite paddle with commingled layers, e.g., made of thermoplastic filaments and fiber filaments commingled at the filament level as illustrated in FIG. 6, covering a narrow core may be more abrasion resistant and more durable because it is less likely to delaminate.

Figure 5C:
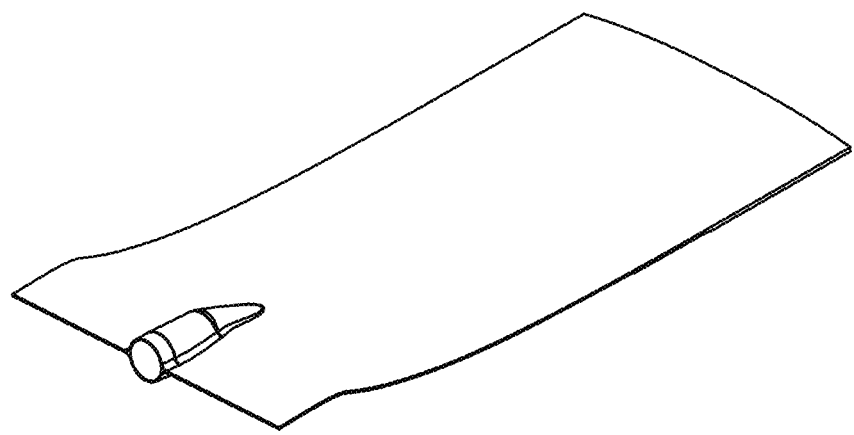
FIG. 5C is a perspective view of a paddle blade before cutting into a profile shape.
Figure 5D:
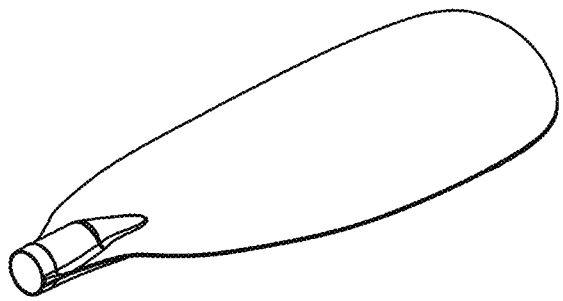
FIG. 5D is a perspective view of a paddle blade after cutting into a profile shape, incorporating aspects of the present disclosure, in accordance with various embodiments.

FIG. 5C is a perspective view of a paddle blade before cutting into a profile shape, and FIG. 5D is a perspective view of a paddle blade after cutting into a profile shape. A blade retrieved from the mold generally is not in the designed profile shape, such as FIG. 5C shows. The blade may be cut by machine or by hand into a profile shape, such as FIG. 5D shows, then the edges of the blade may be polished, e.g., using a polishing wheel coated with an abrasive material.

FIG. 6 is a partial cross-section schematic view of commingled yarn 610, incorporating aspects of the present disclosure, in accordance with various embodiments. One yarn may be made up of thousands of filaments although, for purposes of schematic illustration, far fewer filaments have been depicted. In some embodiments, commingled yarn 610 is commingled and is made of both thermoplastic filaments 620 and fiber filaments 630. A thermoplastic is a polymer that becomes pliable or moldable above a specific temperature and returns to a solid state upon cooling. In some embodiments, thermoplastic filaments 620 may include at least one of polyethylene, polystyrene, or polypropylene; and fiber filaments 630 may include at least one of glass fiber or carbon fiber. In other embodiments, thermoplastic filaments 620 may include acrylic, polybenzimidazole, polyvinyl chloride (PVC), Teflon, or other thermoplastics.

There are many ways to mix thermoplastic filaments 620 and fiber filaments 630 in a layup process to form a kayak paddle. As an example, thermoplastic yarns completely made of thermoplastic filaments 620 may be woven together with fiber yarns completely made of fiber filaments 630 to form a mixed layer. As another example, a thermoplastic layer made of thermoplastic filaments 620 may be attached to a fiber layer made of fiber filaments 630 to form mixed layers. However, commingling thermoplastic filaments 620 and fiber filaments 630 at the filament level, as illustrated in FIG. 6, may provide superior impact and abrasion resistance for kayak paddle construction. Furthermore, a shaft made of commingled yarns 610 may be fail-resistant, such that it is unlikely to fail catastrophically. Instead, the shaft may remain intact and may continue to take the normal forces of paddling. The advantage of such a paddle is that it may allow the paddler to get out of a life-threatening situation.

Figure 7:
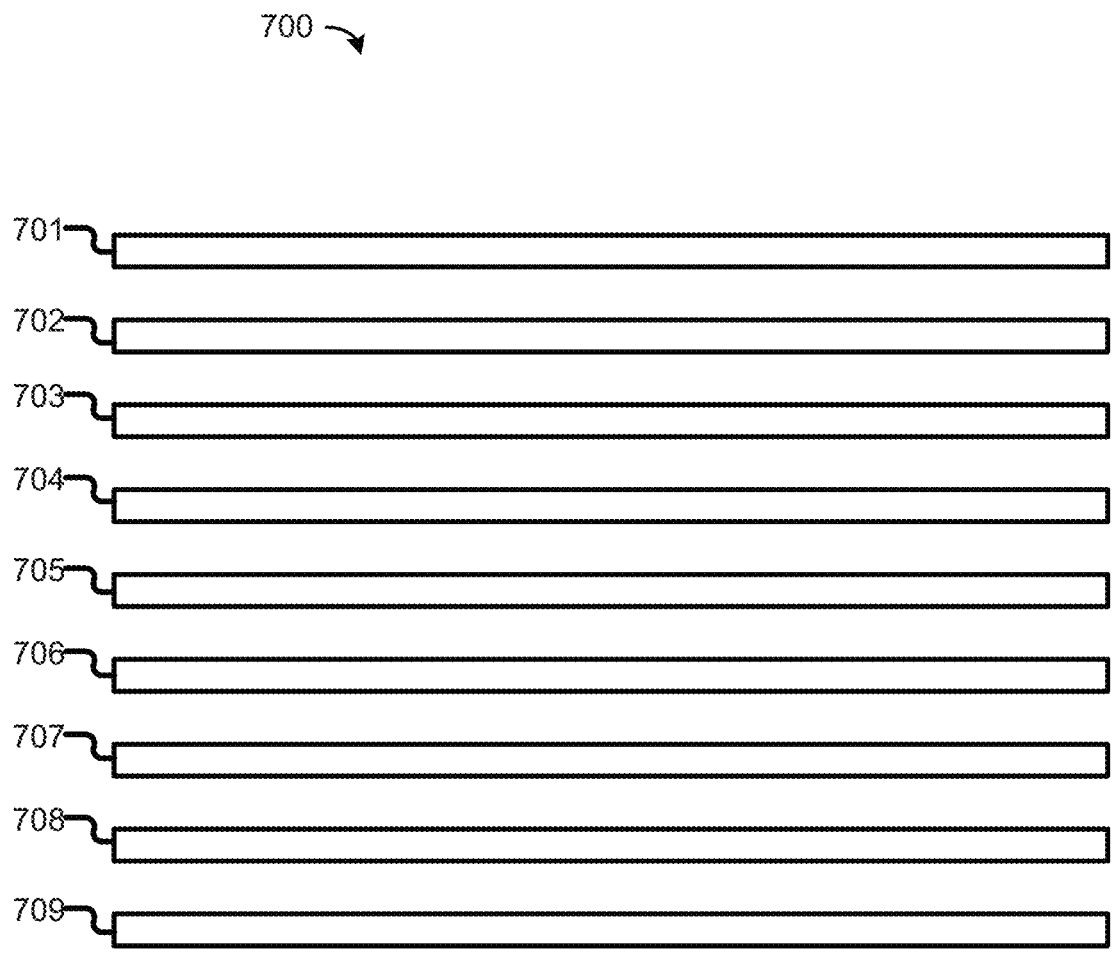
FIG. 7 illustrates a schematic example layup of a composite paddle shaft, incorporating aspects of the present disclosure, in accordance with various embodiments.

FIG. 7 illustrates an example layup 700 of a composite paddle shaft, incorporating aspects of the present disclosure, in accordance with various embodiments. Although there are many durable paddle shafts on the market today, all composite shafts generally suffer from the same flaw—a shaft can catastrophically fail without any warning. It may even be the case that an impending failure may not be apparent in a visual inspection of the paddle shaft. Once the structure of a shaft is compromised, even if only by a slight hairline fracture, a shaft may catastrophically fail, leaving the paddler stranded in a hostile environment without any means of propulsion.

In some embodiments, paddle shafts may be made by wrapping layers of various composite materials around a solid mandrel to form a straight tube shape. In some embodiments, paddle shafts may be made by wrapping layers of various materials around a flexible mandrel that is then placed into a closed mold to form a non-concentric tube shape. There are many different shaft materials, shapes, lengths, and diameters, all of which are created to allow consumers to choose the structure that meets their size, shape, weight, and durability requirements.

As illustrated in FIG. 7, layup 700 may include fiberglass weave 701 placed on top of E-Glass 702, which is an aluminoborosilicate glass having less than 2% alkali. In some embodiments, E-Glass 702 may have a fiber orientation of 0 degrees so that E-Glass 702 fibers may run the length of the shaft, opposed to wrapping around the shaft.

Immediately below E-Glass 702, there may be four carbon layers 703, 704, 705, and 706, which may have different fiber orientations, such as 0 degrees, 90 degrees, +45 degrees, and −45 degrees, respectively. Below those layers there may be film adhesive layer 707 with a fiber orientation of 0 degrees.

Beneath film adhesive layer 707, there is thermoplastic fabric layer 708. In some embodiments, thermoplastic fabric layer 708 may be unidirectional with a fiber orientation of 0 degrees. Advantageously, unidirectional thermoplastic fabric in this layup may prevent the shaft from catastrophic failure because unidirectional fibers generally increase stiffness. In some embodiments, thermoplastic fabric layer 608 may be replaced by a commingled layer, similarly made of thermoplastic filaments and fiber filaments commingled at the filament level as illustrated in FIG. 6.

Below these layers there may be carbon fiber layer 709 with a fiber orientation of 0 degrees. In some embodiments, carbon fiber layer 709 may use 3K weave, which will have approximately 3 mm in width of the weave. In some embodiments, film adhesive may become a bond enhancer, which helps to ensure that thermoplastic fabric layer 708 and carbon fiber layer 709 may thoroughly adhere to one another.

Figure 8:
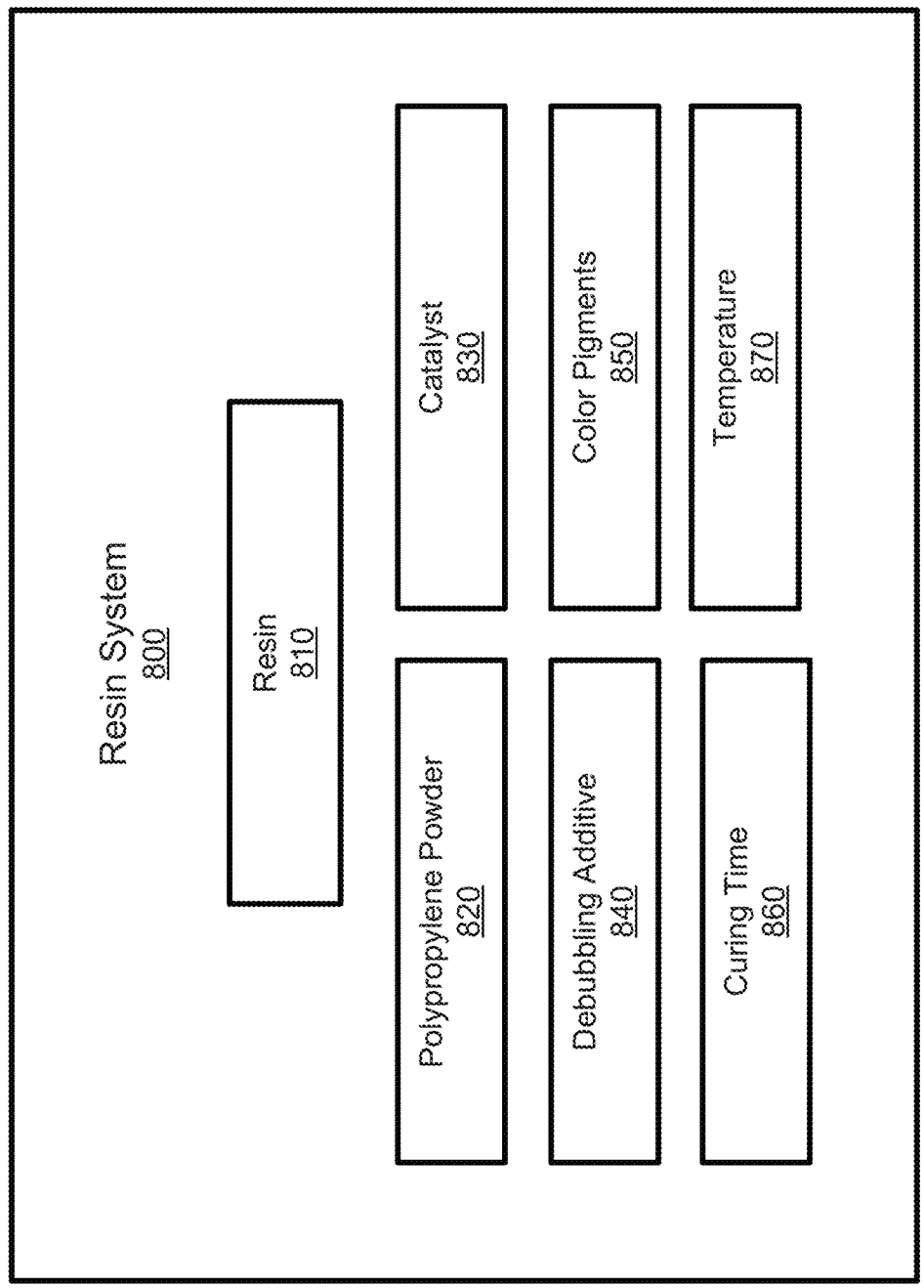
FIG. 8 is a schematic diagram illustrating an example resin system, which may be used in making a composite paddle, incorporating aspects of the present disclosure, in accordance with various embodiments.

FIG. 8 is a schematic diagram illustrating an example resin system 800, which may be used in making a composite paddle, incorporating aspects of the present disclosure, in accordance with various embodiments. In some embodiments, resin system 800 may include resin 810, polypropylene powder 820, catalyst 830, debubbling additive 840, color pigments 850, curing time 860, and temperature 870. In some embodiments, resin system 800 may be used in connection with FIG. 2-5 or 7 in a layup process in forming a paddle.

In one embodiment, resin system 800 may include 310 grams of resin 810, 62 grams of catalyst 830, 3 grams of debubbling additive 840, various color pigments 850, and 3 grams of polypropylene powder 820. In this embodiment, resin system 800 may use a curing time of about 30 minutes with an oven temperature of about 285° F. In some embodiments, polypropylene powder 820 may not exceed 1% of the total volume of resin 810. In some embodiments, polypropylene powder 820 may be less than 1% of the total volume of resin 810. In some embodiments, polypropylene powder 820 may act as a toughening agent. Thus, a paddle made using resin system 800 may be more resistant to abrasion.

In a layup process, once various layers of fabric in a blade are saturated with resin including various additives, the mold used to build the blade may be closed and tightened down to compress the layers and push out air bubbles. Thereafter, the mold may be put into an oven to accelerate cure time.

Figure 9:
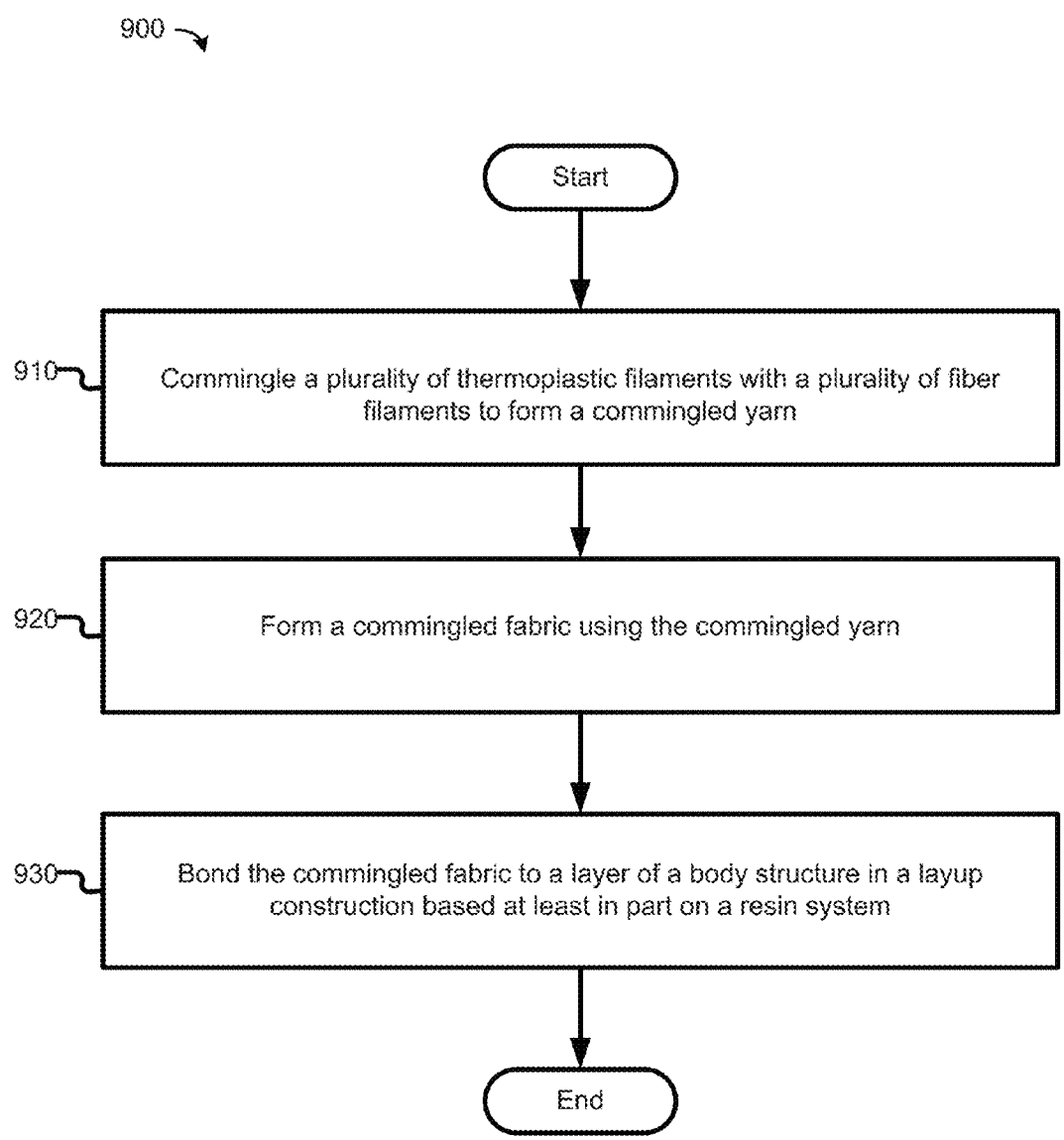
FIG. 9 is a flow diagram of an example layup process for making a composite paddle, incorporating aspects of the present disclosure, in accordance with various embodiments.

FIG. 9 is a flow diagram of an example layup process for making a composite paddle, incorporating aspects of the present disclosure, in accordance with various embodiments. As shown, process 900 may be performed in connection with any one of FIGS. 1-8 to implement one or more embodiments of the present disclosure in forming a composite paddle with a layer of thermoplastic filaments commingled with fiber filaments.

In some embodiments, the process may begin at block 910, where thermoplastic filaments may be commingled with fiber filaments to form a commingled yarn. In some embodiments, the fiber filaments may include at least one of glass fiber or carbon fiber. In some embodiments, the thermoplastic filaments may include at least one of polyethylene, polystyrene, or polypropylene. In some embodiments, the thermoplastic particles in the resin system may include polypropylene powder or polyethylene powder.

Next, at block 920, a commingled fabric may be formed using the commingled yarn. In some embodiments, the commingled fabric may be formed using any known fabric production methods. In some embodiments, commingled yarns or threads may be woven together to form a fabric. In some embodiments, commingled yarns or threads may be knitted together to form a fabric. In other embodiments, lace making, felting, braiding, plaiting, or other fabric production methods may be used to form the commingled fabric using the commingled yarn.

Next, at block 930, the commingled fabric may be bonded to a layer of a body structure in a layup construction based at least in part on a resin system. In some embodiments, the body structure may be a shaft of a paddle, and the thermoplastic filaments and the fiber filaments may be unidirectional. In some embodiments, the body structure may be a blade of a paddle. In some embodiments, the commingled fabric may serve as a full structural layer of the blade to increase impact and abrasion resistance of the blade.

Embodiments of the present disclosure include a paddle blade, which may include a body having opposing outer surfaces and a layered cross-sectional profile. The layered cross-sectional profile may include a layer of thermoplastic filaments commingled with fiber filaments. In some embodiments, the plurality of thermoplastic filaments may include at least one of polyethylene, polystyrene, or polypropylene. In some embodiments, the plurality of fiber filaments may include at least one of glass fiber or carbon fiber. In some embodiments, the commingled layer may be bonded to its adjacent layers based at least in part on an epoxy resin system with thermoplastic particles. The thermoplastic particles may include polypropylene powder or polyethylene powder.

In some embodiments, the commingled layer may have a shape similar to at least one of the opposing outer surfaces of the paddle blade. In some embodiments, the layered cross-sectional profile may include a surface veil layer as one of the opposing outer surfaces, and the commingled layer may be immediately beneath the surface veil layer. In other embodiments, the commingled layer may be located beneath the surface veil layer, with one or more fiber fabric layers in between. In some embodiments, the orientation of the thermoplastic filaments may be different from the orientation of the surface veil layer.

In some embodiments, the body may have a distal end and a proximal end, and the body adjacent to the distal end may have at least one more commingled layer than the body near the proximal end, wherein the at least one more commingled layer includes thermoplastic filaments commingled with fiber filaments. In some embodiments, the commingled layer may form a part of a reinforced tip structure of the body.

In some embodiments, the layered cross-sectional profile may include at least three adjacent layers of unidirectional carbon fiber or unidirectional fiberglass. In some embodiments, the layered cross-sectional profile may include at least one layer of unidirectional carbon fiber or unidirectional fiberglass on each side of a spine of the body.

Embodiments of the present disclosure include a paddle shaft that may be connected to a blade, wherein the shaft may include a layup structure with a commingled layer of thermoplastic filaments commingled with fiber filaments. In some embodiments, the thermoplastic filaments and the fiber filaments may be unidirectional.

In some embodiments, the thermoplastic filaments may include at least one of polyethylene, polystyrene, or polypropylene; and the fiber filaments may include at least one of glass fiber or carbon fiber. In some embodiments, the commingled layer may be bonded to its adjacent layers based at least in part on an epoxy resin system with thermoplastic particles. The thermoplastic particles may include polypropylene powder or polyethylene powder.

In some embodiments, by introducing these kinds of commingled layers into shafts and/or blades, a paddle may be formed that is not only lightweight and stiff but that also has superior impact and abrasion resistance.

Embodiments of the present disclosure include a paddle blade, which may include a spine having a distal end and a proximal end to be connected to a mandrel; and a body having a layered cross-sectional profile to enclose the spine. In some embodiments, the layered cross-sectional profile may include at least three adjacent layers of unidirectional carbon fiber or unidirectional fiberglass.

In some embodiments, the layered cross-sectional profile may include at least one layer of unidirectional carbon fiber or unidirectional fiberglass on each side of the spine. In some embodiments, the layered cross-sectional profile may include a commingled layer to form a reinforced tip structure of the body, and the commingled layer may include a plurality of thermoplastic filaments commingled with a plurality of fiber filaments.

In some embodiments, the layered cross-sectional profile may include a first layer of carbon weave immediately beneath a first veil layer on a power face of the body; and a second layer of carbon weave immediately beneath a second veil layer on a non-power face of the body. In some embodiments, the first layer of carbon weave and a first veil layer on the power face may have same fiber orientations, and the second layer of carbon weave and the second veil layer on the non-power face may have different fiber orientations.

Embodiments of the present disclosure include a paddle blade, which may include a spine having a distal end and a proximal end; and a body, having opposing outer surfaces and a layered cross-sectional profile, to enclose the spine. In some embodiments, the layered cross-sectional profile includes a plurality of commingled layers with a plurality of thermoplastic filaments commingled with a plurality of fiber filaments. In some embodiments, the body near the distal end has at least one more commingled layer than the body near the proximal end.

In some embodiments, the plurality of thermoplastic filaments comprises at least one of polyethylene, polystyrene, or polypropylene; and the plurality of fiber filaments comprises at least one of glass fiber or carbon fiber. In some embodiments, at least one of the plurality of commingled layers is bonded to its adjacent layers based at least in part on an epoxy resin system with thermoplastic particles. In some embodiments, the thermoplastic particles comprise polypropylene powder or polyethylene powder.

In some embodiments, at least two of the plurality of commingled layers have different fiber orientations. In some embodiments, a first commingled layer of the plurality of commingled layers comprises a first length similar to one of the opposing outer surfaces, and a second commingled layer of the plurality of commingled layers near the distal end comprises a second length substantially shorter than the first length. In some embodiments, the layered cross-sectional profile comprises a veil layer as one of the opposing outer surfaces, and one of the plurality of commingled layers is immediately beneath the veil layer.

Embodiments of the present disclosure include a paddle, which may include a blade having at least one layer of unidirectional carbon fiber or unidirectional fiberglass on each side of the blade; and a shaft connected to the blade. In some embodiments, the shaft comprises a layup structure with a layer of unidirectional thermoplastic fabric. In some embodiments, the shaft further comprises a commingled layer of a plurality of thermoplastic filaments commingled with a plurality of fiber filaments, and wherein the plurality of thermoplastic filaments and the plurality of fiber filaments are unidirectional.

In some embodiments, the thermoplastic filaments comprise at least one of polyethylene, polystyrene, or polypropylene; and the fiber filaments comprise at least one of glass fiber or carbon fiber. In some embodiments, the commingled layer is bonded to its adjacent layers based at least in part on a resin system with thermoplastic particles; and the thermoplastic particles comprise polypropylene powder or polyethylene powder.

Embodiments of the present disclosure include a method, which may include commingling a plurality of thermoplastic filaments with a plurality of fiber filaments to form a commingled yarn; weaving the commingled yarn to a commingled fabric; and bonding the commingled fabric in a layup construction to form a tip of a paddle blade based at least in part on a resin system with thermoplastic particles.

In some embodiments, the method may further include adding at least one layer of unidirectional carbon fiber or unidirectional fiberglass on each side of the body structure. In some embodiments, the method may further include adding at least two adjacent layers of unidirectional carbon fiber or unidirectional fiberglass in the layup construction to further build up the body structure.

In some embodiments, the method may further include adding a first layer of carbon weave on a power face of the body structure; and adding a second layer of carbon weave on a non-power face of the body structure. In some embodiments, the first layer of carbon weave and a first veil layer on the power face may have same fiber orientations; and the second layer of carbon weave and a second veil layer on the non-power face may have different fiber orientations. In some embodiments, the first layer of carbon weave may be located immediately beneath the first veil layer; and the second layer of carbon weave may be located immediately beneath the second veil layer.

In some embodiments, the plurality of thermoplastic filaments comprises at least one of polyethylene, polystyrene, or polypropylene; and wherein the plurality of fiber filaments comprises at least one of glass fiber or carbon fiber, and wherein the thermoplastic particles comprise polypropylene powder or polyethylene powder.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A paddle blade, comprising:
a spine having a distal end and a proximal end to be connected to a mandrel; and
a body having a layered cross-sectional profile to enclose the spine;
wherein the layered cross-sectional profile comprises a commingled layer to form a reinforced tip structure of the body, and
wherein the commingled layer comprises a plurality of thermoplastic filaments commingled with a plurality of glass or carbon filaments.

2. The paddle blade according to claim 1, wherein the layered cross-sectional profile comprises at least one layer of unidirectional carbon fiber or unidirectional fiberglass on each side of the spine.

3. The paddle blade according to claim 1, wherein the layered cross-sectional profile comprises at least three adjacent layers of unidirectional carbon fiber or unidirectional fiberglass.

4. The paddle blade according to claim 1, wherein the layered cross-sectional profile further comprises a first layer of carbon weave immediately beneath a first veil layer on a power face of the body; and a second layer of carbon weave immediately beneath a second veil layer on a non-power face of the body.

5. The paddle blade according to claim 4, wherein the first layer of carbon weave and a first veil layer on the power face have same fiber orientations, and wherein the second layer of carbon weave and the second veil layer on the non-power face have different fiber orientations.

6. A paddle blade, comprising:
a spine having a distal end and a proximal end; and
a body, having opposing outer surfaces and a layered cross-sectional profile, to enclose the spine, wherein the layered cross-sectional profile includes a plurality of commingled layers with a plurality of thermoplastic filaments commingled with a plurality of fiber filaments, and wherein the body near the distal end has at least one more commingled layer than the body near the proximal end, wherein a first commingled layer of the plurality of commingled layers comprises a first length similar to one of the opposing outer surfaces, and a second commingled layer of the plurality of commingled layers near the distal end comprises a second length substantially shorter than the first length.

7. The paddle blade according to claim 6, wherein the plurality of thermoplastic filaments comprises at least one of polyethylene, polystyrene, or polypropylene; wherein the plurality of fiber filaments comprises at least one of glass fiber or carbon fiber.

8. The paddle blade according to claim 6, wherein at least one of the plurality of commingled layers is bonded to its adjacent layers based at least in part on an epoxy resin system with thermoplastic particles.

9. The paddle blade according to claim 8, wherein the thermoplastic particles comprise polypropylene powder or polyethylene powder.

10. The paddle blade according to claim 6, wherein at least two of the plurality of commingled layers have different fiber orientations.

11. The paddle blade according to claim 6, wherein the layered cross-sectional profile comprises a veil layer as one of the opposing outer surfaces, and one of the plurality of commingled layers is immediately beneath the veil layer.

12. A paddle, comprising:
a blade having at least one layer of unidirectional carbon fiber or unidirectional fiberglass on each side of the blade; and
a shaft connected to the blade, wherein the shaft comprises a layup structure with a layer of unidirectional thermoplastic fibers oriented substantially along a length of the shaft.

13. The paddle according to claim 12, wherein the shaft further comprises a commingled layer of a plurality of thermoplastic filaments commingled with a plurality of fiber filaments, and wherein the plurality of thermoplastic filaments and the plurality of fiber filaments are unidirectional.

14. The paddle according to claim 13, wherein the thermoplastic filaments comprise at least one of polyethylene, polystyrene, or polypropylene; and wherein the fiber filaments comprise at least one of glass fiber or carbon fiber.

15. The paddle according to claim 13, wherein the commingled layer is bonded to its adjacent layers based at least in part on a resin system with thermoplastic particles; and
wherein the thermoplastic particles comprise polypropylene powder or polyethylene powder.

16. A method, comprising:
bonding a commingled fabric in a layup construction to form a tip of a paddle blade based at least in part on a resin system with thermoplastic particles; and
adding at least one layer of unidirectional carbon fiber or unidirectional fiberglass on each side of the paddle blade,
wherein the thermoplastic particles comprise polypropylene powder or polyethylene powder.

17. The method according to claim 16, further comprising:
adding at least two adjacent layers of unidirectional carbon fiber or unidirectional fiberglass in the layup construction to further build up the paddle blade.

18. The method according to claim 16, further comprising:
adding a first layer of carbon weave on a power face of the paddle blade; and
adding a second layer of carbon weave on a non-power face of the paddle blade.

19. The method according to claim 18, wherein the first layer of carbon weave and a first veil layer on the power face have same fiber orientations; and wherein the second layer of carbon weave and a second veil layer on the non-power face have different fiber orientations.

20. The method according to claim 18, wherein the first layer of carbon weave is immediately beneath the first veil layer; and wherein the second layer of carbon weave is immediately beneath the second veil layer.

21. The method according to claim 16, wherein the commingled fabric comprises a commingled yarn having thermoplastic filaments commingled with fiber filaments; and wherein the thermoplastic filaments comprises at least one of polyethylene, polystyrene, or polypropylene; and fiber filaments comprises at least one of glass fiber or carbon fiber.

* * * * *